US011102253B2

(12) United States Patent
Dröse et al.

(10) Patent No.: US 11,102,253 B2
(45) Date of Patent: Aug. 24, 2021

(54) METHOD AND SYSTEM FOR INTEGRATING REAL TIME COMMUNICATION FEATURES IN APPLICATIONS

(71) Applicant: Snap Inc., Santa Monica, CA (US)

(72) Inventors: Michael Dröse, Hohenstein (DE); Tadeusz Kozak, Knurow (PL); Kavan Antony Seggie, London (GB); Dmitry Sobinov, Omsk (RU)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/866,934

(22) Filed: May 5, 2020

(65) Prior Publication Data

US 2020/0267190 A1    Aug. 20, 2020

Related U.S. Application Data

(63) Continuation of application No. 16/100,801, filed on Aug. 10, 2018, now Pat. No. 10,681,092, which is a
(Continued)

(51) Int. Cl.
*G06F 15/16* (2006.01)
*H04L 29/06* (2006.01)
(Continued)

(52) U.S. Cl.
CPC ......... *H04L 65/1069* (2013.01); *G06Q 20/14* (2013.01); *H04L 43/087* (2013.01); *H04L 43/0858* (2013.01); *H04L 43/0894* (2013.01); *H04L 65/608* (2013.01); *H04L 65/80* (2013.01); *H04L 67/02* (2013.01); *H04L 67/1074* (2013.01)

(58) Field of Classification Search
None
See application file for complete search history.

(56) References Cited

U.S. PATENT DOCUMENTS 5,999,932 A   12/1999  Paul
6,154,764 A   11/2000  Nitta et al.
(Continued)

OTHER PUBLICATIONS

"U.S. Appl. No. 14/536,532, Notice of Allowance dated Apr. 15, 2015", 12 pgs.
(Continued)

*Primary Examiner* — Quang N Nguyen
(74) *Attorney, Agent, or Firm* — Schwegman Lundberg & Woessner, P.A.

(57) ABSTRACT

A computer has a processor and a memory connected to the processor. The memory stores instructions executed by the processor to receive a real time communication request from a client device and perform an evaluation of the number of client devices associated with the real time communication request. The evaluation results in the coordination of peer-to-peer communications in the event of two client devices and an attempt to host a real time communication session using a first protocol in the event of three or more client devices. A second protocol for the real time communication session is invoked in the event that the attempt to host the real time communication session using the first protocol is unsuccessful.

20 Claims, 9 Drawing Sheets

Related U.S. Application Data continuation of application No. 15/784,579, filed on Oct. 16, 2017, now Pat. No. 10,069,876, which is a continuation of application No. 14/746,752, filed on Jun. 22, 2015, now Pat. No. 9,794,303, which is a continuation of application No. 14/536,532, filed on Nov. 7, 2014, now Pat. No. 9,083,770.

(60) Provisional application No. 61/916,562, filed on Dec. 16, 2013, provisional application No. 61/909,343, filed on Nov. 26, 2013.

(51) Int. Cl.
G06Q 20/14 (2012.01)
H04L 29/08 (2006.01)
H04L 12/26 (2006.01)

(56) References Cited

U.S. PATENT DOCUMENTS

| | | |
|---|---|---|
| 6,154,821 A | 11/2000 | Barth et al. |
| 6,167,435 A | 12/2000 | Druckenmiller et al. |
| 6,204,840 B1 | 3/2001 | Petelycky et al. |
| 6,216,141 B1 | 4/2001 | Straub et al. |
| 6,310,694 B1 | 10/2001 | Okimoto et al. |
| 6,442,590 B1 | 8/2002 | Inala et al. |
| 6,484,196 B1 | 11/2002 | Maurille |
| 6,665,531 B1 | 12/2003 | Soderbacka et al. |
| 6,724,403 B1 | 4/2004 | Santoro et al. |
| 6,757,713 B1 | 6/2004 | Ogilvie et al. |
| 6,898,626 B2 | 5/2005 | Ohashi |
| 7,124,164 B1 | 10/2006 | Chemtob |
| 7,149,893 B1 | 12/2006 | Leonard et al. |
| 7,203,380 B2 | 4/2007 | Chiu et al. |
| 7,356,564 B2 | 4/2008 | Hartselle et al. |
| 7,519,670 B2 | 4/2009 | Hagale et al. |
| 8,001,204 B2 | 8/2011 | Burtner et al. |
| 8,078,730 B2 | 12/2011 | Travostino |
| 8,112,716 B2 | 2/2012 | Kobayashi |
| 8,276,092 B1 | 9/2012 | Narayanan et al. |
| 8,279,319 B2 | 10/2012 | Date |
| 8,312,086 B2 | 11/2012 | Velusamy et al. |
| 8,312,097 B1 | 11/2012 | Siegel et al. |
| 8,379,130 B2 | 2/2013 | Forutanpour et al. |
| 8,405,773 B2 | 3/2013 | Hayashi et al. |
| 8,418,067 B2 | 4/2013 | Cheng et al. |
| 8,471,914 B2 | 6/2013 | Sakiyama et al. |
| 8,560,612 B2 | 10/2013 | Kilmer et al. |
| 8,744,523 B2 | 6/2014 | Fan et al. |
| 8,775,972 B2 | 7/2014 | Spiegel |
| 8,788,680 B1 | 7/2014 | Naik |
| 8,797,415 B2 | 8/2014 | Arnold |
| 8,856,349 B2 | 10/2014 | Jain et al. |
| 9,450,784 B2 * | 9/2016 | Schmidt .............. H04L 12/6418 |
| 10,069,876 B1 | 9/2018 | Dröse et al. |
| 10,681,092 B1 | 6/2020 | Drose et al. |
| 2002/0047868 A1 | 4/2002 | Miyazawa |
| 2002/0122659 A1 | 9/2002 | Mcgrath et al. |
| 2002/0144154 A1 | 10/2002 | Tomkow |
| 2003/0016247 A1 | 1/2003 | Lai et al. |
| 2003/0052925 A1 | 3/2003 | Daimon et al. |
| 2003/0126215 A1 | 7/2003 | Udell et al. |
| 2003/0164856 A1 | 9/2003 | Prager et al. |
| 2004/0027371 A1 | 2/2004 | Jaeger |
| 2004/0111467 A1 | 6/2004 | Willis |
| 2004/0148351 A1 * | 7/2004 | Cotte ................ H04L 29/06027 |
| | | 709/205 |
| 2004/0203959 A1 | 10/2004 | Coombes |
| 2004/0243531 A1 | 12/2004 | Dean |
| 2005/0078804 A1 | 4/2005 | Yomoda |
| 2005/0097176 A1 | 5/2005 | Schatz et al. |
| 2005/0104976 A1 | 5/2005 | Currans |
| 2005/0114783 A1 | 5/2005 | Szeto |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson et al. |
| 2005/0223066 A1 | 10/2005 | Buchheit et al. |
| 2006/0114338 A1 | 6/2006 | Rothschild |
| 2006/0270419 A1 | 11/2006 | Crowley et al. |
| 2007/0040931 A1 | 2/2007 | Nishizawa |
| 2007/0073823 A1 | 3/2007 | Cohen et al. |
| 2007/0082707 A1 | 4/2007 | Flynt et al. |
| 2007/0192128 A1 | 8/2007 | Celestini |
| 2007/0214216 A1 | 9/2007 | Carrer et al. |
| 2007/0233801 A1 | 10/2007 | Eren et al. |
| 2007/0243887 A1 | 10/2007 | Bandhole et al. |
| 2007/0255456 A1 | 11/2007 | Funayama |
| 2008/0025701 A1 | 1/2008 | Ikeda |
| 2008/0033930 A1 | 2/2008 | Warren |
| 2008/0104503 A1 | 5/2008 | Beall et al. |
| 2008/0207176 A1 | 8/2008 | Brackbill et al. |
| 2008/0222545 A1 | 9/2008 | Lemay |
| 2008/0256446 A1 | 10/2008 | Yamamoto |
| 2008/0266421 A1 | 10/2008 | Takahata et al. |
| 2008/0270938 A1 | 10/2008 | Carlson |
| 2008/0313346 A1 | 12/2008 | Kujawa et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0132453 A1 | 5/2009 | Hangartner et al. |
| 2009/0132665 A1 | 5/2009 | Thomsen et al. |
| 2009/0160970 A1 | 6/2009 | Fredlund et al. |
| 2009/0265647 A1 | 10/2009 | Martin et al. |
| 2010/0082693 A1 | 4/2010 | Hugg et al. |
| 2010/0131880 A1 | 5/2010 | Lee et al. |
| 2010/0131895 A1 | 5/2010 | Wohlert |
| 2010/0159944 A1 | 6/2010 | Pascal et al. |
| 2010/0161831 A1 | 6/2010 | Haas et al. |
| 2010/0185665 A1 | 7/2010 | Horn et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0257196 A1 | 10/2010 | Waters et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0102630 A1 | 5/2011 | Rukes |
| 2011/0145564 A1 | 6/2011 | Moshir et al. |
| 2011/0197194 A1 | 8/2011 | D'Angelo et al. |
| 2011/0211534 A1 | 9/2011 | Schmidt et al. |
| 2011/0213845 A1 | 9/2011 | Logan et al. |
| 2011/0273575 A1 | 11/2011 | Lee |
| 2011/0283188 A1 | 11/2011 | Farrenkopf |
| 2011/0320373 A1 | 12/2011 | Lee et al. |
| 2012/0011233 A1 | 1/2012 | Dixon et al. |
| 2012/0028659 A1 | 2/2012 | Whitney et al. |
| 2012/0062805 A1 | 3/2012 | Candelore |
| 2012/0108293 A1 | 5/2012 | Law et al. |
| 2012/0110096 A1 | 5/2012 | Smarr et al. |
| 2012/0113272 A1 | 5/2012 | Hata |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0184248 A1 | 7/2012 | Speede |
| 2012/0198531 A1 * | 8/2012 | Ort .................. H04W 12/06 |
| | | 709/227 |
| 2012/0200743 A1 | 8/2012 | Blanchflower et al. |
| 2012/0210244 A1 | 8/2012 | De Francisco et al. |
| 2012/0212632 A1 | 8/2012 | Mate et al. |
| 2012/0220264 A1 | 8/2012 | Kawabata |

(56) References Cited

U.S. PATENT DOCUMENTS

| | | |
|---|---|---|
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0278387 A1 | 11/2012 | Garcia et al. |
| 2012/0278692 A1 | 11/2012 | Shi |
| 2012/0299954 A1 | 11/2012 | Wada et al. |
| 2012/0304080 A1 | 11/2012 | Wormald et al. |
| 2012/0307096 A1 | 12/2012 | Ford et al. |
| 2012/0323933 A1 | 12/2012 | He et al. |
| 2013/0050260 A1 | 2/2013 | Reitan |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0128059 A1 | 5/2013 | Kristensson |
| 2013/0145286 A1 | 6/2013 | Feng et al. |
| 2013/0151623 A1 | 6/2013 | Weiser et al. |
| 2013/0152153 A1 | 6/2013 | Weiser et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0290443 A1 | 10/2013 | Collins et al. |
| 2013/0344896 A1 | 12/2013 | Kirmse et al. |
| 2013/0346877 A1 | 12/2013 | Borovoy et al. |
| 2014/0011538 A1 | 1/2014 | Mulcahy et al. |
| 2014/0032682 A1 | 1/2014 | Prado et al. |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0279436 A1 | 9/2014 | Dorsey et al. |
| 2014/0280537 A1 | 9/2014 | Pridmore et al. |
| 2014/0282096 A1 | 9/2014 | Rubinstein et al. |
| 2014/0317302 A1 | 10/2014 | Naik |
| 2014/0325383 A1 | 10/2014 | Brown et al. |
| 2015/0046278 A1 | 2/2015 | Pei et al. |
| 2016/0094638 A1* | 3/2016 | Suri ................ H04L 47/193 709/232 |
| 2016/0335072 A1 | 11/2016 | Choo et al. |
| 2018/0176318 A1* | 6/2018 | Rathod ............ G06Q 20/384 |
| 2019/0297119 A1* | 9/2019 | Vashisht ........... H04L 65/4023 |

OTHER PUBLICATIONS

"U.S. Appl. No. 14/536,532, Notice of Allowance dated May 22, 2015", 5 pgs.

"U.S. Appl. No. 14/746,752, Notice of Allowance dated Jun. 16, 2017", 11 pgs.

"U.S. Appl. No. 15/784,579, Notice of Allowance dated May 3, 2018", 14 pgs.

"U.S. Appl. No. 16/100,801, 312 Amendment filed Apr. 24, 2020", 4 pgs.

"U.S. Appl. No. 16/100,801, Notice of Allowance dated Jan. 28, 2020", 11 pgs.

"U.S. Appl. No. 16/100,801, PTO Response to Rule 312 Communication dated May 4, 2020", 2 pgs.

"International Application Serial No. PCT/US2014/040346, International Search Report dated Mar. 23, 2015", 2 pgs.

"International Application Serial No. PCT/US2014/040346, Written Opinion dated Mar. 23, 2015", 6 pgs.

"iVisit Mobile: Getting Started", Ivisit, [Online] Retrieved from the Internet: <URL: http://web.archive.org/web/20140830174355/http://ivisit.com/support_mobile>, (Dec. 4, 2013), 16 pgs.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible for", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

U.S. Appl. No. 14/536,532 U.S. Pat. No. 9,083,770, filed Nov. 7, 2014, Method and System for Integrating Real Time Communication Features in Applications.

U.S. Appl. No. 14/746,752 U.S. Pat. No. 9,794,303, filed Jun. 22, 2015, Method and System for Integrating Real Time Communication Features in Applications.

U.S. Appl. No. 15/784,579 U.S. Pat. No. 10,069,876, filed Oct. 16, 2017, Method and System for Integrating Real Time Communication Features in Applications.

U.S. Appl. No. 16/100,801, filed Aug. 10, 2018, Method and System for Integrating Real Time Communication Features in Applications.

\* cited by examiner

METHOD AND SYSTEM FOR INTEGRATING REAL TIME COMMUNICATION FEATURES IN APPLICATIONS

CROSS-REFERENCE TO RELATED APPLICATIONS

This application is a continuation of U.S. patent application Ser. No. 16/100,801, filed Aug. 10, 2018, issued on Jun. 9, 2020 as U.S. Pat. No. 10,681,092, which is a continuation of U.S. patent application Ser. No. 15/784,579, filed Oct. 16, 2017, issued on Sep. 4, 2018 as U.S. Pat. No. 10,069,876, which is a continuation of U.S. patent application Ser. No. 14/746,752, filed Jun. 22, 2015, issued on Oct. 17, 2017 as U.S. Pat. No. 9,794,303, which is a continuation of U.S. patent application Ser. No. 14/536,532, filed Nov. 7, 2014, issued on Jul. 14, 2015 as U.S. Pat. No. 9,083,770 which claims priority to U.S. Provisional Patent Application Ser. No. 61/909,343, filed Nov. 26, 2013, and U.S. Provisional Patent Application Ser. No. 61/916,562, filed Dec. 16, 2013, the contents of each of which are incorporated herein by reference in their entireties.

TECHNICAL FIELD

This invention relates to real time communications in a computer network. More particularly, this invention relates to techniques for integrating real time communication features into software applications.

BACKGROUND

Real time communication tools allow users to communicate in real time. The real time communication can include audio, video, images, etc. The real time communication tools are available as stand-alone applications that can be installed on devices or as web browser based applications. However, the current real time communication tools do not provide efficient ways to integrate them into existing software applications. Further, they lack reliability, efficiency and adaptability to network bandwidth features.

SUMMARY

A computer has a processor and a memory connected to the processor. The memory stores instructions executed by the processor to receive a real time communication request from a client device and perform an evaluation of the number of client devices associated with the real time communication request. The evaluation results in the coordination of peer-to-peer communications in the event of two client devices and an attempt to host a real time communication session using a first protocol in the event of three or more client devices. A second protocol for the real time communication session is invoked in the event that the attempt to host the real time communication session using the first protocol is unsuccessful.

DETAILED DESCRIPTION

Technology is disclosed for integrating real time communication (RTC) features into software applications ("the technology"). Various embodiments of the technology provide an RTC tool that allows users, e.g., application developers to integrate RTC features into software applications. The RTC features support streaming of content including audio, video, and screen sharing. In some embodiments, the RTC tool is generated using Web Real-Time Communication (WebRTC) application programming interfaces (APIs). The WebRTC enables browser-to-browser applications for voice calling, video chat, and P2P file sharing without plugins. The RTC tool can be integrated in various popular platforms. For example, the RTC tool is available as a JavaScript for web applications (this can use native WebRTC for browsers supporting it and a native NPAPI/ActiveX plug-in otherwise), as native Java® for Android® devices, as Objective-C for iOS® devices, native C for Mac OS X® and Microsoft Windows® for desktop applications.

The client software development kit (SDK) of the RTC tool allows the application to establish a connection to the streaming infrastructure of the tool and create a multimedia session with multiple contributing sources (e.g., clients connected to the streaming service), and media types. Additionally it is possible to exchange messages between peers connected to the same session or scope, using the reliable data channel.

RTC Tool Components

Figure 1:
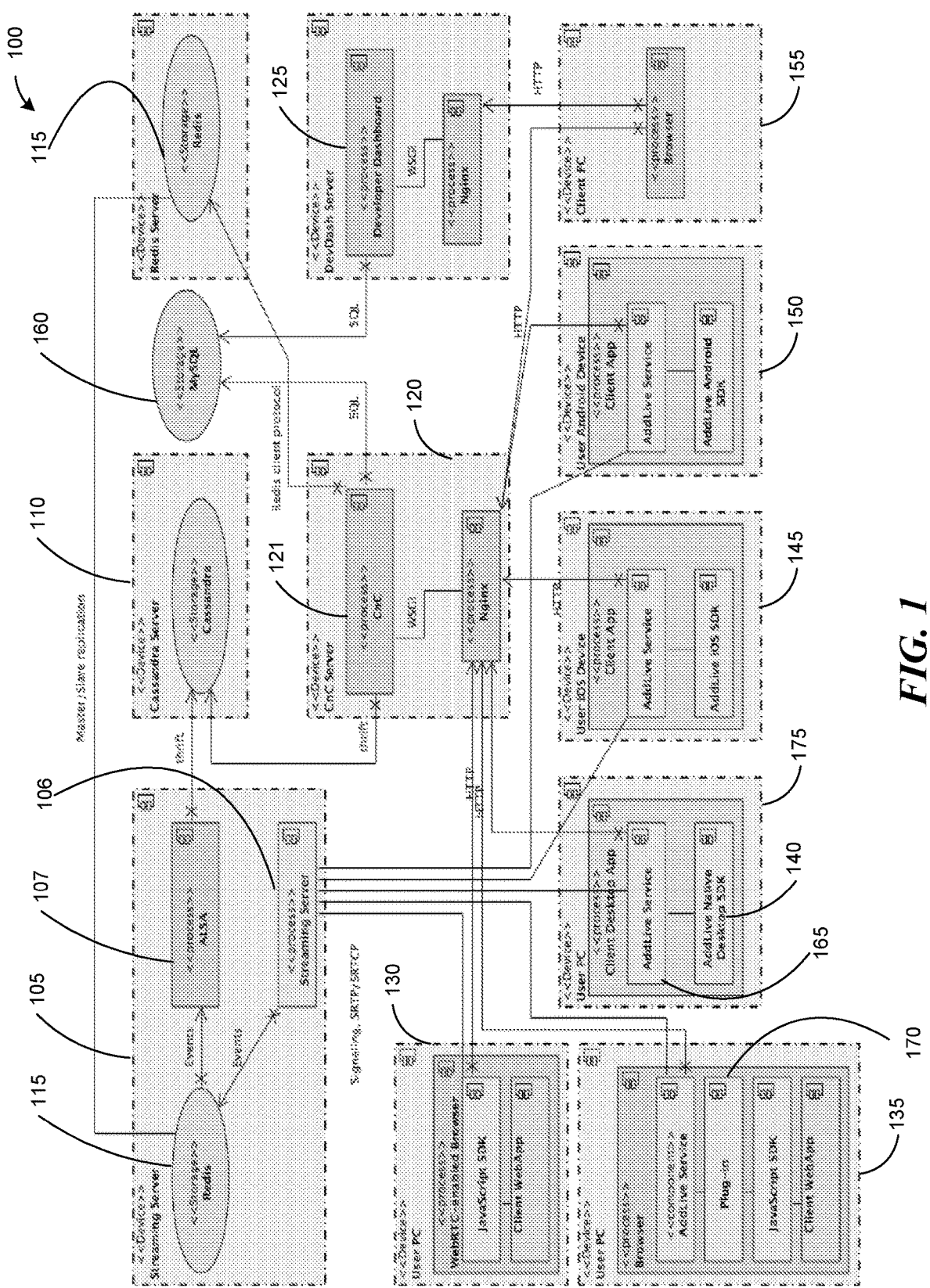
FIG. 1 is a block diagram of a system illustrating an RTC tool, consistent with various embodiments of the disclosed technology.

FIG. 1 is a block diagram of a system 100 illustrating an RTC tool, consistent with various embodiments of the disclosed technology. The RTC tool includes several, distributed components. For example, the RTC tool includes server-side components that run on the RTC collaboration infrastructure, e.g., provided by an RTC provider, and client-side components that construct the client SDKs and run on user devices, e.g., user devices 130-155 consuming the RTC features provided by the RTC tool. The RTC tool also includes data storage components.

Server Side Components

The server-side components include a streaming server device 105 having a streaming server 106 that provides the core streaming functionality of the RTC tool 100. Other components, including the Command and Control (CnC) application 121 and the streamer agent 107 provide a support framework for the core streaming functionality. The RTC tool 100 also includes the database engines such as MySQL® 160, Redis® 115 and Cassandra® 110.

Server Side Components—Streaming Server

The streaming server 106 (hereinafter referred to as "streamer") is the core component of the RTC collaboration infrastructure. The streamer serves a role of an intelligent multipoint control unit (MCU) providing services, including media streams relaying, quality control and signaling.

The streamer 106 is effectively a smart packet relay. It transmits packets between peers connected to the same virtual video conference room (referred to as "Media Scope", "scope" or "session"). There can be two use cases for this functionality: multiparty conferences and Network Address Translation (NAT) traversal. Whenever there are more than two participants in the session, the data is relayed to ensure that the client sends the data only once. This allows the RTC tool to utilize the most efficient media session topology, e.g., the star topology. In case of the one-to-one sessions with at least one user behind a NAT device using an implementation other than the endpoint-independent mapping, as per RFC 4787 [2], relaying makes the data transmission possible.

The streamer 106 can also be responsible for all the measurements and feedback notifications required to ensure the quality of the session for all the peers participating. This can apply in both directions of media streams—from client to the streamer 106 and vice versa. When ensuring the stream quality from peers to the streamer 106, the server-side component measures the loss, one-way packet queuing delay and generates Real-time Transport Control Protocol (RTCP) receiver report (as per RFC 3550) feedback messages sent to the clients. The client SDKs use this information to adapt the quality of the sent stream accordingly. The downstream adaptation is done in a similar way. This time, the client side performs all the measurements and notifies the streamer 106 using RTCP receiver report (RR) messages. It then controls which peer should receive high video quality feed and which one a lower video quality feed.

The streamer 106 provides signaling communication required to establish and maintain a media session. It allows each client to know where and how to send the media streams when establishing a media session. The signaling controls also the basic presence by letting all the peers know who is connected to the session and what kind of media streams are published by every participant. Finally, it provides reliable data channel functionality.

The streamer runs as an independent process in the streaming server device 105. In some embodiments, it does not require any application container (e.g., Tomcat®) or front end, reverse-proxy server (Ngnix®, Apache®). The streamer 106 can be implemented using various programming languages, e.g., C/C++ programming languages, etc., and several open source libraries such as boost, Google® protocol buffers, oRTP®, OpenSSL®, Google Breakpad®, Hiredis®, JSONCPP®, etc.

The streamer 106 interacts with the client SDKs and the streamer agent 107. In some embodiments, the client SDK-streamer communication is done by the signaling and media streaming protocols. In the latter case the streamer 106 uses a local instance of the Redis® database server 115 to pass asynchronous events with usage and quality statistics.

Server Side Components—Command and Control Application

The CnC application 121 executing in a CnC server 120 is a web application that manages clusters of streaming server instances. The CnC application 121 associates an instance of the streamer 106 with a multimedia session, ensuring that: (1) all peers requesting a connection to the same media session will use the same streaming server 106 instance, (2) the load is distributed evenly across all the streamers 106 available and (3) the geographically closest streamer 106 is used.

The CnC application 121 is also responsible for persistence of the diagnostic data, including bug reports, logs, devices etc. The CnC application 121 provides an API to access the analytics data stored in Cassandra® database 110. The API can be consumed by the JavaScript® components of the Developer Dashboard 125 of the RTC tool. The CnC web application 121 can be implemented using various programming languages such as Python®, and can use open source Python® libraries such as Flask®, Simpleapi® and Jinja2®. The CnC application 121 may not interact directly with other server-side components, instead it can use the database engines employed by the RTC tool. As stated above, the Redis® database 115 is used to maintain the session streamer mappings. The Cassandra® database 110 is queried for the usage and quality statistics when serving the API requests. The MySQL® database 160 can be used for persisting automatic error reports.

Server Side Components—Streamer Agent

The streamer agent 107 is a server side component that helps to maintain a set of streaming servers 106. The streamer agent 107 receives events from streamers 106, process them to generate usage and quality statistics, and persist the statistics using the Cassandra® database 110. The streamer agent 107 can receive events, including (1) session created (triggered by first connection to a session), (2) session joined (triggered after any connection to a session, including the first one), (3) session left (triggered after any disconnection from a session), (4) session disposed (triggered after the last participant leaves a session), and (5) media stream quality statistics (sent periodically for every media stream included in an active session).

The events related to the session lifecycle (created, joined, left, disposed) can be required to collect session information—when it was started and ended, who was participating and when each participant joined or left the session. The media stream quality statistics events are useful for analyzing the system behavior under certain condition, which allows system optimizations. The streaming agent 107 releases the session-streamer mapping when the session disposed event is received.

In one embodiment, the streamer agent 107 interacts with two database engines: Redis® 115 as a source of events and Cassandra® 110 as a persistent data store. Regarding the implementation details, the streamer agent 107 can be a daemon process, implemented using various programming languages, including Python® and open source third party Python libraries such as Redis®, Pycassa®, Jsonpickle® and Supervisor®.

Data Storage Components

The RTC tool uses various data storage components for storing data associated with RTC features.

Data Storage Components—MySQL®

The MySQL® database 160 is used by the RTC to store information including clients, applications, billing data (monthly minute usage per application), details about the WebRTC streaming server instances, etc. The MySQL® database 160 can be used by the components of CnC server 120 and developer dashboard 125.

Data Storage Components—Cassandra®

In one embodiment the RTC tool uses Cassandra® database 110 to persist the usage and quality statistics including:

- RTC tool usage: This is stored as a number of sessions, connections and minutes with hourly, daily and weekly resolution. The data are stored also in several contexts: system-wide, per application, per SDK type and finally per SDK type and application.
- Real-time usage: The number of active sessions and connections. The data is stored also in contexts as above.
- Sessions: This includes information such as when each session started, ended, a maximum number of concurrent participants in the session, overall session quality and state (complete, active). Also, participants' details such as user id, session joined and left timestamps, IP address, SDK version and type, minutes used and hardware profile (CPU, webcam, microphone and speakers), etc. are stored.
- Quality statistics: The quality state of every participant is persisted, with 5 second resolution. This can include metrics like: bandwidth of audio and video streams, delay, loss (cumulative and traction), round-trip delay time. CPU utilization, and encoded picture quality.
- Aggregated quality statistics: The quality metrics mentioned above are also saved as aggregated histograms, using Cassandra® counters. Data can be stored in context of a single session and daily.
- Participants distribution: Histograms of the count of sessions that reached a particular number of maximum concurrent participants over a whole session lifespan. This is stored in context of each application and system-wide with daily resolution.
- Top 100 indexes: The references to the top 100 sessions, sorted ascending and descending in following categories: duration, quality, concurrent participants and minutes used. This is stored with a daily resolution.
- Client SDK logs: The logs can be stored and used for diagnostics.

In some embodiments, the Cassandra® database 110 is a "NoSQL" storage engine. A NoSQL database provides a mechanism for storage and retrieval of data that employs less constrained consistency models than traditional relational databases. The Cassandra® database is used by the CnC application 121 and streaming agent 107 modules.

Data Storage Components—Redis®

The Redis® database 115 can be used for exchanging events between the streaming server 106 and the components of streamer agent 107, and for providing to the streamer 106 a way to get an API key when authenticating a connection request. In some embodiments, the Redis® database 115 is a No-SQL database. The Redis® database can be hosted on cloud services such as Amazon EC2®.

Client Side Components

The client-side components of the RTC tool includes internal components of client SDKs and the API bindings, which are described in further detail in the following paragraphs.

Client Side Components—RTC Client Side Service

The RTC client side service (referred to as "RTC client"), e.g., RTC client 165, is one of the core client-side components. The RTC client 165 can be responsible for the RTC features, especially where the native WebRTC implementation is not available, e.g., in mobile SDKs, desktop SDKs and browsers without the native support for the WebRTC via an RTC Plug-in 170. The RTC client 165 can contain modules for video conferencing aspects such as video capture devices management, video coding, quality control, networking, business logic and an audio engine built on top of the libWebRTC.

The API published by the RTC client 165 is composed of a few functions that use primitive values (integers, C-strings, pointers to platform specific structures for rendering, e.g., HWND—a handle to window in Microsoft Windows®). The service functionality is available via a function—invoke, which takes as the input parameter an invocation request serialized as a string. Internally the request is parsed and delegated to a proper internal function. The requests handling is implemented using known reactor design patterns, where all the requests are put in a queue by the calling thread and processed by a single Service thread. This approach can allow calls from application user interface (UI) thread, and reduce the possibility of synchronization issues within the RTC client 165 implementation.

The RTC client 165 can be implemented using various programming languages, including portable C/C++ with platform specific subcomponents responsible for video capture devices handling, rendering and logging. It can be distributed as a native library, e.g., dll on Microsoft Windows®, dylib on Apple Mac OS X®, .framework for iOS® development, .so for Android® development, etc. The RTC client 165 interacts with the API bindings, the RTC Plug-in 170, the Operating System and the server-side components.

Client Side Components—RTC Plug-in

The RTC Plug-in 170 uses the RTC client 165 to provide real-time audio and video streaming functionality to browsers not supporting the WebRTC technology natively. The RTC Plug-in 170 uses NPAPI standard on browsers supporting it and the ActiveX® on Microsoft Internet Explorer®. The browser compatibility layer is implemented with the help of the FireBreath® open source library. The RTC tool uses a unique approach to keeping the software up to date—the RTC Plug-in 170 passes the requests to the RTC client 165 without being aware of the RTC client 165 functionality. The RTC client 165 component can be replaced while the RTC Plug-in 170 is loaded in memory without the need to restart the browser.

Client Side Components—API Bindings

The RTC client 165 uses several API bindings allowing users, e.g., application developers who integrate RTC tool into their software applications to use the RTC client 165 with the various platforms available on the market. The APIs offered include

- JavaScript® for the web and the mobile development: The JavaScript® binding allows developers to build web applications and mobile applications (using the PhoneGap plug-in). The web version of the SDK can perform intelligent initialization to decide whether the RTC Plug-in 170 or native WebRTC implementation should be employed. In some embodiments, this is done using feature detection of the host browser and application requirements negotiation as not all features are yet available natively on all browsers (e.g., screen sharing). The API itself is built around a particular namespace, e.g., "ADL" with the RTC tool interface providing the RTC client 165 functionality and a listener, e.g., "ALServiceListener" allowing application to hook into platform-specific notifications.
- ANSI C for desktop applications: The ANSI C API bindings allow developers to add video conferencing functionality to desktop applications. The binding creates a thin layer on top of the RTC client 165, defining all the methods exposed by it as a set of static functions. Each function starts with the a particular prefix, e.g., "adl", prefix and takes as an input a pointer to an opaque structure containing all the RTC client 165 context.

Objective-C for Apple iOS®: The Objective-C API bindings also offer a thin layer on top of the RTC client 165 component. The API is structured around several classes, including "ALService" offering the core of the functionality and the "ALServiceListener" protocol to notify application about the service events.

Java® bindings for the Android® platform: The Java® bindings also create a thin, object-oriented layer on top of the RTC client 165. All the classes and interfaces involved are grouped within a package, e.g., the com.addlive package.

Communication Protocols

The RTC tool uses various communication protocols, e.g., between the server side components and the client side components. The RTC tool uses at least three classes of communication protocols: the signaling protocol for media session establishment and maintenance, the media protocols for transmission of media data: audio, video, screen, and for the auxiliary communication for diagnostics and platform maintenance.

The signaling and media streaming protocols can be used in communication between the RTC client 165 or WebRTC-enabled browser and the streaming server 105. The auxiliary communication can be performed between the client SDKs and the CnC web application 121.

Communication Protocols—Signaling

The RTC tool uses various protocols, including a proprietary protocol for the signaling part of the client server communication. The existing protocols that have been considered for this purpose (SIP, H.323), were designed to accomplish a calling scenario, where peer A calls peer B in order to establish media session. The client SDKs, e.g., desktop SDK 175, to establish a multimedia session between peer A and B (or any other peers involved) make a logical connection to a single virtual room—the media scope or session. This use case requires the flexibility not offered by any of the aforementioned protocols, which led to a proprietary protocol. The protocol designed is built on top of a reliable Transport Layer Security (TLS) over Transmission Control Protocol (TCP) channel and can use Google® Protocol Buffers library for messages serialization.

The TLS over TCP is selected for various reasons. First of all, the TCP protocol offers a reliability of the data delivery, which can be crucial for the use case. Additionally, since the rate of the signaling messages exchanged is fairly low, the variable latency of the TCP is not an issue. Finally the use of TLS/TCP and port 443 on the streamer 106 side allows the protocol to mimic HTTPS traffic, which improves the ability to traverse firewall and NAT devices. In one embodiment, the signaling protocol (also called the "management link") is composed of following message types:

Authentication request (client to server)—Sent by a client when initiating a connection to the streamer 106. Message body includes client details, id of session to connect to and an authentication signature required to validate the request.

Authentication response (server to client): Sent in response to the authentication request. Contains the authentication status (success or failure with an error code) and in case of a successful connection, all the details required by a peer to establish the media connection to the Streamer. This includes media UDP endpoints, a fallback TCP endpoint and encryption keys.

User events (bidirectional): Messages used by the RTC client 165 and the Streamer to exchange information about a change of the streaming status (stream of a particular media type was published or unpublished) or the user status (a remote peer connected or disconnected from a session). The User events are also used for: reliable messaging (via the sendMessage API), the management link maintenance and finally for control over the P2P and relayed media streaming modes.

Media events (bidirectional): The media events are used by both the Streamer and client SDKs to ensure the quality of media link. They are used whenever the media channel needs to notify other peers about a change in state or make a request in a reliable way.

Communication Protocols—Media Streaming

The transmission of the real-time media data places high demands on the networking infrastructure. These requirements include but are not limited to:

High and constant bandwidth: The average SD quality video stream generated by the RTC client 165 can consume between 500-750 kbps of the bandwidth available. HD streams are even more demanding, with bit rates as high as 2000 kbps.

Figure 2:
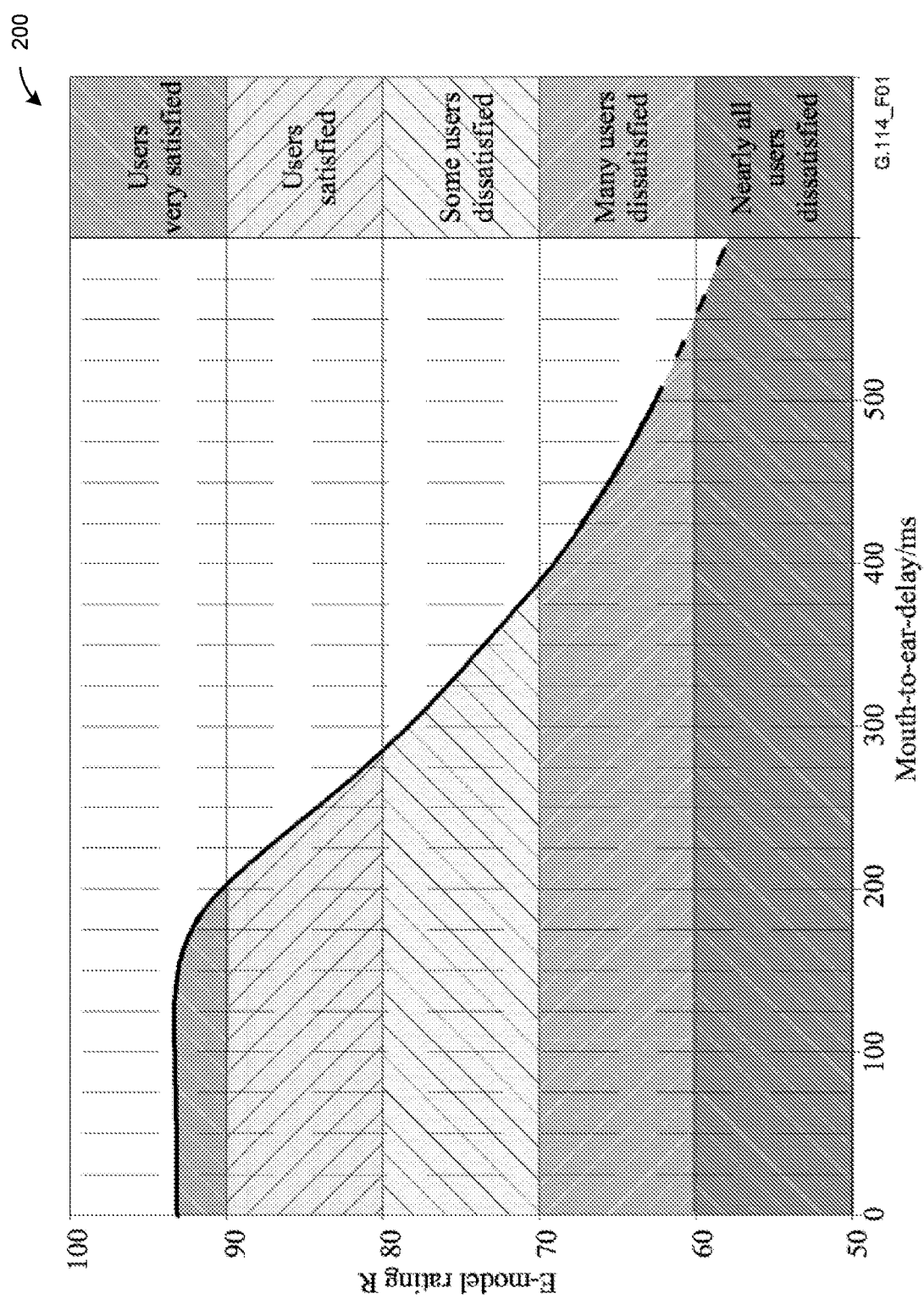
FIG. 2 is a graph illustrating the effects of absolute delay in audio streaming, consistent with various embodiments of the disclosed technology.

Low network latency: The ITU-T Recommendation G.114 [1] addresses the impact that the mouth-to-ear delay (latency) has on the quality of a call. The recommendation states that most people do not sense any call degradation if the delay is below 200 ms. On the other hand, most people will claim that a conversation is of poor quality if the delay increases above the 400 ms threshold. The relationship between the call latency and call quality experience is depicted in FIG. 2.

Network reliability: By design the Internet is an unreliable medium. This makes the streaming of audio and video media difficult, as significant packet loss degrades the audio and video quality.

Constant packet flow: The stable packet flow is essential to ensure that the component consuming the media stream always has access to the most recent data. It is important, as the playout is linear in time. Any deviation in packet interarrival time (measured as the inter-arrival jitter), if not compensated, will cause the playout device to be either drained (no data available) or overflowed (too much data). To accommodate this issue, VoIP systems use buffering techniques. Unfortunately, bigger deviation in the packet interarrival time requires a longer jitter buffer to compensate for it. As was stated in the Low network latency point above, any buffering has a significant impact on the call latency which in turn affects the conversation quality.

The RTC tool is designed to ensure the best quality possible, even in environments as hostile as the WAN. The RTC tool uses a suit of media protocols to ensure the best quality where possible and fallback to the best effort when required. The core protocol used is the industry standard SRTP and RTCP. Using it as a base, the RTC tool also supports following transport mechanisms for the media streaming: (1) User Datagram Protocol (UDP) in peer-to-peer mode (P2P), (2) UDP relayed through the streaming server 106, and (3) Transport Layer Security (TLS) over TCP fallback trough the streaming server 106.

Figure 3:
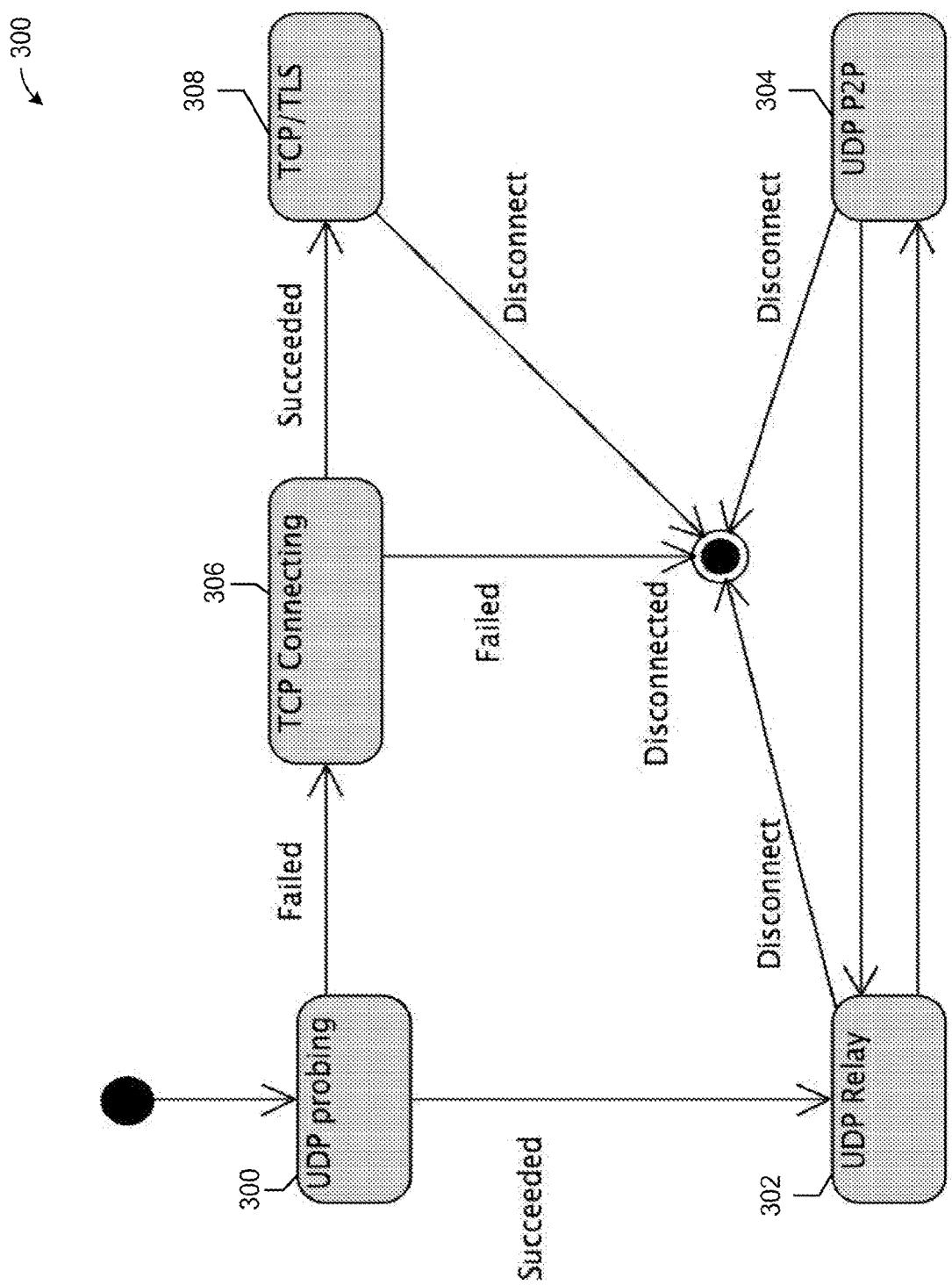
FIG. 3 is a state diagram illustrating state transitions between different media connection types, consistent with various embodiments of the disclosed technology.

The RTC tool uses the UDP relayed protocol as a primary media streaming transport mechanism. After the client SDK 175 establishes the management link to the Streamer 106, the RTC client 165 will first try to use this protocol. If the UDP communication fails (most likely due to a firewall restriction), the RTC client 165 will try to reach the Streamer 106 over the TCP fallback transport type. The P2P mode of the UDP based protocol is used as an optimization in case there are only two peers connected to a scope. The state transitions between different media connection types are shown in the FIG. 3. Initially, UDP probing 300 is performed. Is successful, a UDP relay 302 is established with a UDP P2P 304. UDP probing 300 fails, TCP connecting 306 is pursued. If successful, a TCP/TLS session 308 transpires. Disconnection occurs upon a disconnect state of a failed TCP connection 306.

The following sections provide more detailed description of each of the media transport mechanisms employed by the RTC tool.

UDP Relay Connection

The UDP relay connection is the primary connection type for the RTC tool. The RTC client 165 tries to establish this type of a connection as soon as the authentication response from the streamer 106 is received. To ensure that the UDP packet flow is functional, the client component sends a series of probing packets to the UDP ports given in the response. After receiving at least a single reply, the UDP channel is considered as functional and the media packets flow begins.

The UDP relay uses multiple UDP ports for streaming purposes. In some embodiments, initially the client SDK 175 will attempt to connect to the streamer 106 using ports 540 for the audio stream and the port 541 for video. This is to ease the port-based Quality of Service (QoS) polices when using the on-premise deployments. If the RTC client 165 fails to communicate using the default ports, it will proceed and attempt to establish the connection using the TCP fallback. Upon a success, it will try to establish UDP connectivity again, using multiple possible remote UDP ports, with audio and video multiplexed within a single channel. This is to leverage the existing firewall exception policies that may be configured on the end user network for other media streaming services.

TLS Over TCP Fallback Connection

The TLS over TCP connection is treated as a fallback for clients behind restrictive firewall devices. The RTC client 165 will try to establish the TCP streaming connection when the UDP probing timeout occurs. The connection is made to the same host and the same port as with the management link—port 443. Once the TCP and TLS connection is established, the connection is considered as functional and the media packets flow will start. Since the TCP uses data streams instead of datagrams, the RTC tool uses Protocol Buffers messages to serialize and de-multiplex between signaling and media packets.

UDP P2P Connection

An attempt to establish the Peer-to-Peer (P2P) transport is done only when there are two clients in the session and if the UDP relay works for both of them. The notification to enable the P2P mode is always sent by the streamer 106. This is because, in some embodiments, the streamer 106 is the only component that has all the data needed to decide whether this mode should be enabled. The data includes the exact number of users connected, type of media protocol used by each participant, and the public UDP endpoints used by participants.

The notification is sent using the user event message over the signaling channel. The body of the message contains only the public UDP endpoint of the remote peer. The RTC client 165 will use this information and probe the endpoint. Upon a success, the data transmission is smoothly transitioned to use the direct link. The communication between the RTC client 165 and streamer 106 is maintained, even when the media streaming uses direct channel. This is to ensure that the port mapping is maintained on the NAT device used by the client.

The P2P connection establishment process employs the core mechanisms from the RFC 5245[4] ICE protocol, such as: UDP hole punching, exchange of UDP endpoints visible from the WAN or heart-beating.

Proxy Support

The signaling and media streaming protocols are functional also when the end-user device is connected to the Internet via a proxy. The RTC tool supports following various proxy server types, including: SOCKS5 TCP and UDP proxies, without the authentication support, HTTPS proxies not requiring authentication, HTTPS proxies requiring basic or digest authentication, HTTPS proxies using Kerberos/NTLM for authentication.

Auxiliary Communication

The RTC client 165 communicates also with the CnC application 121. For this purpose, it can use the HTTPS protocol. A streamer endpoint resolution is a process where an application id and scope id are passed to the CnC component 121, to resolve which streamer 106 should be used to conduct the session. The request can be made using HTTPS GET method with parameters encoded in the query string. The CnC application 121 can reply using a plain text string, e.g., in the form of STREAMER_HOST+":"+ STREAMER_PORT.

The RTC client 165 can use several POST requests to facilitate automatic bug reports in case of a platform failure, media devices used during a session upon a successful connection, service logs while the client is connected to any session, etc.

RTC Tool Quality Adaptation

The RTC tool provides an adaptive layer protecting an end user's endpoint from congestion and resources overuse (e.g., CPU overuse). The RTC tool controls the quality of the video streams to ensure the fixed, high quality of audio streaming. The RTC tool can scale the quality of the video feed from, e.g., 64 kbps (QVGA @10 FPS) up to 1-1.5 Mbps (720p @ 24 FPS). It means that the streams generated by the RTC tool can require as little as 100 kbps of bandwidth for the tool to operate The RTC tool uses 3 types of quality control adaptation including Uplink adaptation, Downlink adaptation, and Peer to Peer adaptation.

Uplink Adaptation

The Uplink adaptation monitors client network to detect: packet queuing delay to avoid the congestion early (before there is loss), packet loss (in case of networks lossy in general) and increased jitter.

The reduction of the quality is done on various levels: quality of the encoder (target bitrate), size of the video feed and amount of the frames per second.

When publishing the video stream, an application tells the SDK the maximum quality it wants to publish (max width, height and frames per second). The SDK uses this as an upper cap of the quality of the video feed.

Downlink Adaptation

The downlink adaptation uses an approach called simulcast. For the simulcasting, the RTC tool uses two separate video streams (no SVC, streams are not related): high quality video feed (the dynamic bitrate and quality, see uplink adaptation) and low quality feed (fixed bitrate and quality). In one embodiment, the high quality feed is the primary one exchanged between the peers by default.

The low quality feed is used when one of the peers involved in a session has problems with the reception of the data. The streamer can detect this by increased loss and/or queuing delay. In this case the streamer will request one or more other participants to start publishing an extra low quality feed, which gets delivered to the peer with issues to reduce the bandwidth utilization and avoid congestion.

Peer to Peer Adaptation

When session has only two users connected, the session uses a single layer of dynamic quality. Each peer can reduce quality when there are issues on the uplink side, exactly as per the uplink adaptation. When it comes to congestion when receiving the data, each peer reports to the other peer the capacity of the downlink. When the uplink side detects that the other end has problems with the reception, it will back off the quality to a level where the queuing delay is stable (thus, the capacity of the channel was reached).

RTC Tool Reliability

The following paragraphs provide a brief overview of the reliability of the RTC tool. In some embodiments, the RTC tool can ensure a 99.95% up-time reliability policy. In some embodiments, to ensure the reliability, the RTC tool focuses on the streaming service 106.

Streamer Reliability

The RTC tool is built on the assumption that each instance of the streamer 106 may fail at any time. The following paragraphs describe the techniques to ensure service resilience to outages of a single instance of the streamer 106.

Streamer Reliability—Reconnects

The key facility to achieve this resilience is the reconnects. When the client SDK 175 detects a lost connection, it will automatically try to recover by reestablishing a connection. To achieve this it will request a streaming endpoint from the CnC application 121. This request can contain two additional query string parameters (in addition to applicationId and scopeId): e.g., "reconnect=true" to explicitly indicate that this is a reconnect request, "streamer-endpoint" to inform the CnC application 121 about which instance of the streamer potentially failed.

The CnC application 121 handles those special mapping requests by checking the health of the Streamer reported and by returning a new one if necessary. The exact procedure can be described using the following example procedure:

1. Obtain an entity describing the streamer instance 106 from the MySQL® database 160, using the host name and the port given in the request,
2. Check whether the entity is marked as active,
3. If false then the streamer has been tested by a previous request handler and marked as inactive. Return false, go to Step 9.
4. From the entity, get the time when the streamer was last validated.
5. If the time is less than 1 minute, the Streamer has been checked by a previous request handler and was marked as active (functional). Return true, go to Step 9.
6. Verify the Streamer instance 106 functionality.
7. If the validation is successful then update the validated_at timestamp to now Return true.
8. If the Streamer validation fails, then mark the Streamer instance 106 as inactive. Return false.
9. End.

If the above procedure reports that the streamer is functional, the existing mapping will be returned to the client. Otherwise, a new instance of the streamer 106 can be selected using the following example procedure:

1. Lock the mapping for resetting using the following subroutine:
2. If the locking subroutine returned true, go to Step 4.
3. Get the current mapping using the GET command and return it to the client. Go to Step 8.
4. Select a new streamer instance.
5. Store the mapping in Redis® 115 using SET with TTL set to 24 hours.
6. Release the lock obtained in Step 1 by deleting the key defined by the locking subroutine: APPLICATION_ID+"_"+SCOPE_ID+"_lock".
7. Return the mapping to the client.
8. End.

Finally, an embodiment of the locking subroutine is composed of following example steps.

1. Generate the lock key as string: APPLICATION_ID+"_"+SCOPE_ID+"lock".
2. Using the Redis® SET command try to set the key value pair using the string from Step 1 as key and true as value: SET KEY true NX EX 5. The above command will try to set the value of the key to true, only if it was not already defined (NX flag) with the time to live set to 5 seconds (EX 5).
3. If the result of the SET command is true, then the key was set and thus the lock was effectively obtained. Return true.
4. Sleep 100 ms.
5. Check the value of the key generated in Step 1 using the GET command.
6. If it is null then the lock was released. Return false.
7. Go to Step 4.
8. End.

Before sending this request, the client SDK 175 can wait a random amount of milliseconds (between one and two seconds). This approach can serve two purposes: to prevent a flood of similar requests and to cover the case when a streamer 106 crashed and instantly restarted by the supervisor daemon.

Streamer Reliability—Monitoring

As another reliability measure, the RTC tool monitors the health of the streamer processes 106 and hosts. It allows the RTC tool to detect issues before they are experienced by end users such as end users 130, 135, 140, 150 and 155. In one embodiment, the monitoring facility is composed of the following layers:

Supervisor daemon: Every streamer process 106 is controlled by a supervisor daemon. The daemon ensures that the process is always running and in a case of a crash it will restart the stream instantly.

Internal self-checks: Hosts 105 running the streamer 106 use a scheduled cron job to periodically test all streamer instances 106. The service validation is performed by making a connection identical to the connection made by the client SDK 175. When a failure occurs, the verification script uses the supervisor to restart the failed instance. Furthermore, an administrator, e.g., the RTC tool administrator, is notified to further diagnose any potential issues.

Nagios® monitoring: The RTC tool uses Nagios® to monitor the health of the streamer processes 106. It uses the same scripts as the internal self-checks from the second point above. The main purpose of this layer is to visualize the status of the cluster.

Munin: Finally, to ensure that there are no issues with the Streamer hosts they are being monitored using Munin.

Command and Control Application Reliability

The CnC application 121 is a web application can be implemented with Python® and Flask®. In some embodiments, reliability of the CnC application 121 can be ensured using tools and methodologies publicly available. The CnC application 121 can run on completely separate deployments in different cloud server regions, e.g., Amazon EC2® regions (North Virginia and Oregon). Both of these deployments can use distinctive domain names, e.g., cnc2.addlive.com and cnc3.addlive.com.

The implementation of the client SDK 175 uses all configured CnC endpoints for the streamer endpoint resolution. At first, it will choose a random endpoint from the list configured. If the resolution fails, it will iterate repeatedly through the available resolvers until one succeeds or the retry limit is reached.

Both CnC deployments use the same setup. This configuration uses Nginx® as a reverse proxy with multiple nodes attached to a single upstream. Subsequently each node that is linked the master Nginx® server, uses Nginx® as a reverse proxy and has multiple uWSGI processes as final workers. Additionally, the configuration of the leaf http server uses a retry policy where an error result triggers the request to be passed to the next uWSGI process in the upstream. This approach allows the platform to seamlessly handle temporal issues with e.g., database connectivity.

Redis® Reliability

The Redis® datastore 115 is used throughout the RTC tool. The RTC tool uses two separate deployments of Redis® 115, e.g., one to store the API keys and the other to maintain the session-streamer mappings. The reliability of both deployments is achieved in different ways due to different usage patterns. This is described in the following paragraphs.

Redis® Reliability—Credentials Store Reliability

Each streaming node runs a local copy of the Redis® server 115 and communicates with it using the Unix® domain sockets. Every local database server is connected to a single master as a read-only slave. Whenever customers create, modify or remove the API credentials, these data are stored in a SQL database and in the Redis® master server. The Redis® master server then populates the API credentials to all the slaves.

This approach makes the authentication process robust. Since the local instances of Redis® are employed for authentication, the service will operate seamlessly even if the master node fails or any network partitioning occurs. In case of master failure, to restore the API credentials store manageability, the RTC tool administrator is only required to start another host running an instance of the Redis® server, populate it with the data from the MySQL database 160 and assign the designated elastic IP.

Furthermore, a failure of a slave usually occurs due to a failure of the complete host, in which case the streaming service is already compromised on the node. The crash of a Redis® server 115 is highly unlikely and is handled manually either by restarting the Redis® server 115 process or by replacing the streaming node with a completely new instance.

Redis® Reliability—Streamer Mapping Reliability

In some embodiments, to scale the service horizontally, the RTC tool uses multiple instances of the Redis® database 115 to store the session-streamer mappings. The instance to be used by a particular mapping is defined using a simple partitioner, which uses an application id and a session id to generate an index of the Redis® node to be used. Additionally, this approach improves reliability as there is no single point of failure.

To keep the service operational when one of those instances fails, every instance has a read-only slave. When there is an issue with one of the master database servers, the CnC application 121 that detected it instantly falls back to the slave, effectively promoting it to a new master. This is possible because Redis® 115 allows itself to be reconfigured on-line using the CONFIG SET commands.

Temporary Infrastructure Creation Kit

The temporary infrastructure creation kit provides entities using the RTC tool to provide RTC features to their clients, with a package (e.g., bundle, distribution) that will contain RTC tool provider assets (e.g., server side components, client SDKs, Plug-in installers, etc.) and a set of scripts that will take a descriptor as an input and will spin off a cluster of all the necessary infrastructure.

With this approach, whenever the infrastructure maintained, e.g., streamer 106, by the RTC provider for the functioning of the RTC tool fails, the entities can still provide RTC services to their clients, with no to minimal downtime. The above described method provides an effective disaster recovery technique. This way, the entities using the RTC tool can be sure of the RTC tool's availability and trust the RTC tool provider. The temporary infrastructure creation kit can be used when the RTC infrastructure maintained by the RTC tool provider fails. In some embodiments, a client will have to initiate it manually if certain outage was reached or we went out of business.

RTC Tool Security

The following paragraphs explain the security features of the RTC tool. The security analysis covers following areas. (1) Connection Authentication—validation that only allowed users can connect to a particular session, (2) Communication security—assessment of the media and signaling channels security to prevent eavesdropping, (3) Binary components security—assessment of the security of the binaries installation processes to prevent use of the RTC tool as a target vector for installation of malicious software.

RTC Tool Security—Connection Authentication

Within the RTC tool each and every connection made to the WebRTC streaming server 106 needs to be authenticated. This is to ensure that only the users that are allowed by the original application, connect and receive streams from other peers. The authentication scheme does not require any communication between the server side components and the RTC tool. Instead, on the server side, the application should prepare all the required data, sign them using a shared secret (a.k.a. "API Key") and pass it to the client component of the application. The client side then, should use the data given, to prepare the connection descriptor.

To authenticate a given connection request, the RTC tool expects data, including the following data to be provided:

application id—It explicitly identifies an application using the client SDK 175.

user id—Application unique identifier for the particular user. Having this property in set of authentication fields, allows the developer to explicitly control who can join a media session with a given id. Also this property allows the application to uniquely identify remote peers when handling events dispatched by the RTC tool in the context of a remote peer.

scope id or session id—Identifies an identifier of a session to which a connection attempt is being made. This property is a second component required to control who can join which session.

Salt—Random string used when calculating the authentication signature. It increases the signature entropy.

expiry timestamp—Universal time co-ordinates (UTC) Timestamp, defining how long the authentication signature should be valid. It prevents malicious users from hijacking already calculated signatures and reusing them outside of the application control.

Signature—Authentication signature which guarantees that the connection request is being made on behalf of our client. In some embodiments, it is a SHA-256 hash, calculated from a string generated by concatenation of all the above attributes and the API key. The signature can be represented as a hex-string, uppercased.

The above authentication data should be passed, e.g., in the authDetails attribute of the ConnectionDescriptor object passed to the connect method of the API binding.

Communication Security

Communication Security—Signaling

In order to protect user data from eavesdropping, the signaling messages are transmitted over the TLS/TCP channel using the TLS 1.0 encryption scheme. In some embodiments, the scheme is configured as follows: (1) cipher suites are restricted to 128 and 256 bit key AES encryption, (2) key exchange is done using the Ephemeral Diffie-Hellman algorithm, (3) for peer authentication, the RSA algorithm is employed, (4) for message (block) authentication the SHA1 algorithm is employed.

Communication Security—Media Streaming

In some embodiments, the media data flow is protected using the Secure Real-time Transport Protocol (SRTP). The SRTP provides confidentiality, message authentication and replay protection. The keys used for media encryption are volatile, generated by the streamer 106 during the session creation (when the first participant joins the session). Once generated, the key is not persisted anywhere and is transmitted to peers within the auth response message over the already secured signaling channel.

In some embodiments, the SRTP encryption scheme is configured in the following way: (1) AES CBC 128 bit key for RTP packet encryption, (2) HMAC SHA1 for packet authentication and integrity, (3) No RTCP packets authentication.

Communication Security—Binary Components Security

This section covers briefly the security of the binary components installed on the end-user computer, e.g., RTC Plug-in 170 installation and self-updating.

The RTC Plug-in 170 is available for various operating systems, including Apple Mac OS X® and Microsoft Windows® operating systems. On the Windows® platform, the installation process is done using a custom installer binary. Also on this platform, all the binaries used by the RTC Plug-in 170 or Native Desktop SDK are cryptographically signed, using a certificate issued by a well trusted certifying authority, e.g., GlobalSign® Inc.

On The Mac OS X® platform, all the binaries are signed using the certificate issued by Apple® as a part of Mac OS X® developer program.

The RTC Plug-in 170 self-update process from security perspective works in the same way on both desktop platforms. In some embodiments, it can be described in following high-level steps:
1. Download the update descriptor file. This file contains several properties describing the latest distribution available. This includes: the version number, URL pointing to update bundle, SHA-256 checksum of the update bundle, and finally a signature. The SHA-256 checksum is used to validate the downloaded bundle integrity and the signature is to ensure that the bundle was generated by the RTC tool provider.
2. Compare the currently installed version with the one available on-line.
3. If the versions are the same Go to Step 13.
4. Download the update bundle.
5. Download the public key to validate the signature.
6. Validate the certificate—make sure that it is not expired, is authorized by a legal certificate authority and was issued to RTC tool provider.
7. Calculate the signature from the bundle file.
8. Compare the signature with the one defined in the update descriptor.
9. If it does not match, return an error. Go to Step 13.
10. Uncompress the update bundle.
11. Deploy it to the plug-in installation directory.
12. After the update, the RTC Plug-in 170 instantly loads into process memory the latest version of the RTC Client 165 binary. The Plug-in binary will be updated automatically after the browser restart.
13. End.

Also as an additional security means, all the update components and installers are protected by a monitoring service ensuring that the binaries available are those uploaded by the RTC tool provider responsible for the distribution.

Figure 4:
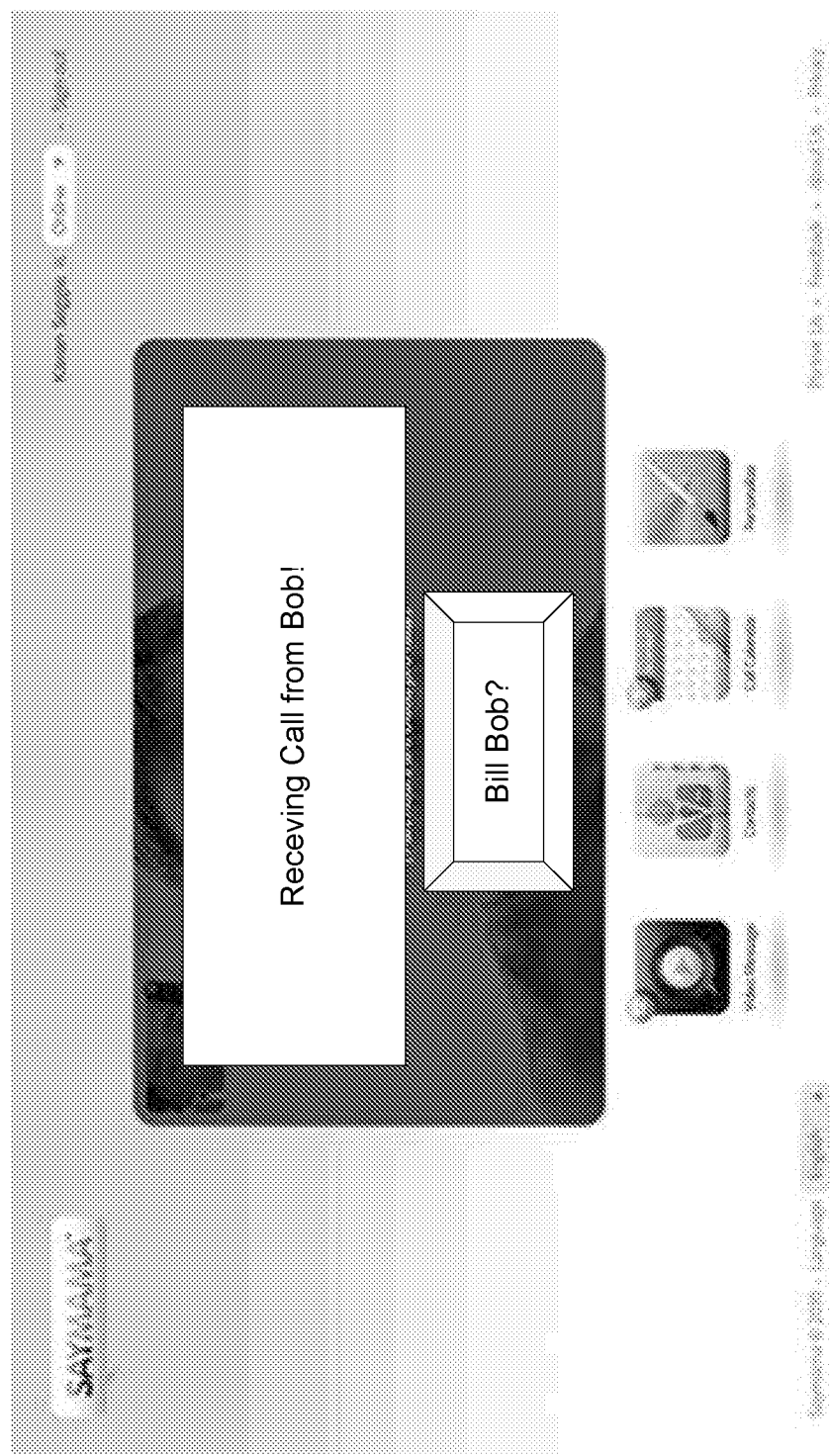
FIG. 4 is an example GUI of an RTC application for sending a charge to one or more users in the RTC application, consistent with various embodiments of the disclosed technology.

FIG. 4 is an example GUI of an RTC application for sending a charge to one or more users in the RTC application, consistent with various embodiments of the disclosed technology. The example GUI 400 illustrates an RTC application "SAYMAMA." The RTC application provides audio-video conferencing functionalities. Users can communicate with each other over the RTC application. Users can exchange audio and video data between them. That is, a user can hear the audio and view the video from one or more other users logged in the RTC application. The users can also send messages and share other data such as files between them.

In some embodiments, the RTC application can also be used for commercial purposes. For example, service providers, such as attorneys, can providing counseling to their clients using the RTC application. The service provider and the client may view and hear each other using the RTC application. In some embodiments, the RTC application may require the users who wish to the use the RTC application to sign up and create a profile with the RTC application.

The RTC application includes a mechanism for a service provider to bill a client who wishes to use his/her services. In the GUT 400, a service provider "Kavan" receives a call from a user or a client "Bob" who wishes to talk to Kavan. The service provider can choose whether to accept or reject the call from the client. If the service provider chooses to accept the call, the service provider may also choose to bill the call. The service provider may send the charge to the client using the mechanism, e.g., a button "Bill Bob?" provided on the GUI 400. The client can choose to accept or reject the charge as explained at least with reference to FIGS. 4-7. Accordingly, embodiments of the disclosed technology enables billing a user in a single click of a button.

Figure 5:
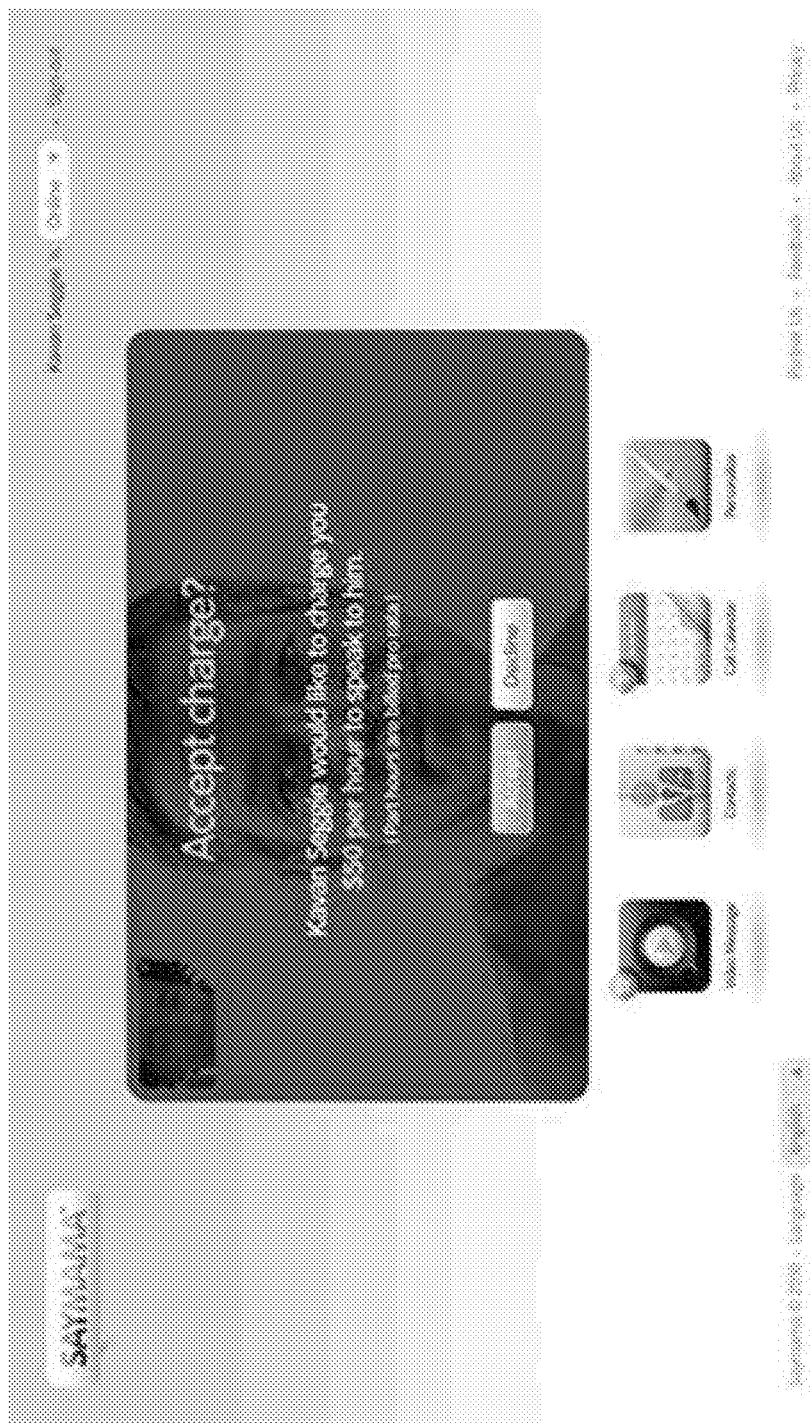
FIG. 5 illustrates an example GUI for displaying a charge notification to a user in an RTC application, consistent with various embodiments of the disclosed technology.
Figure 6:
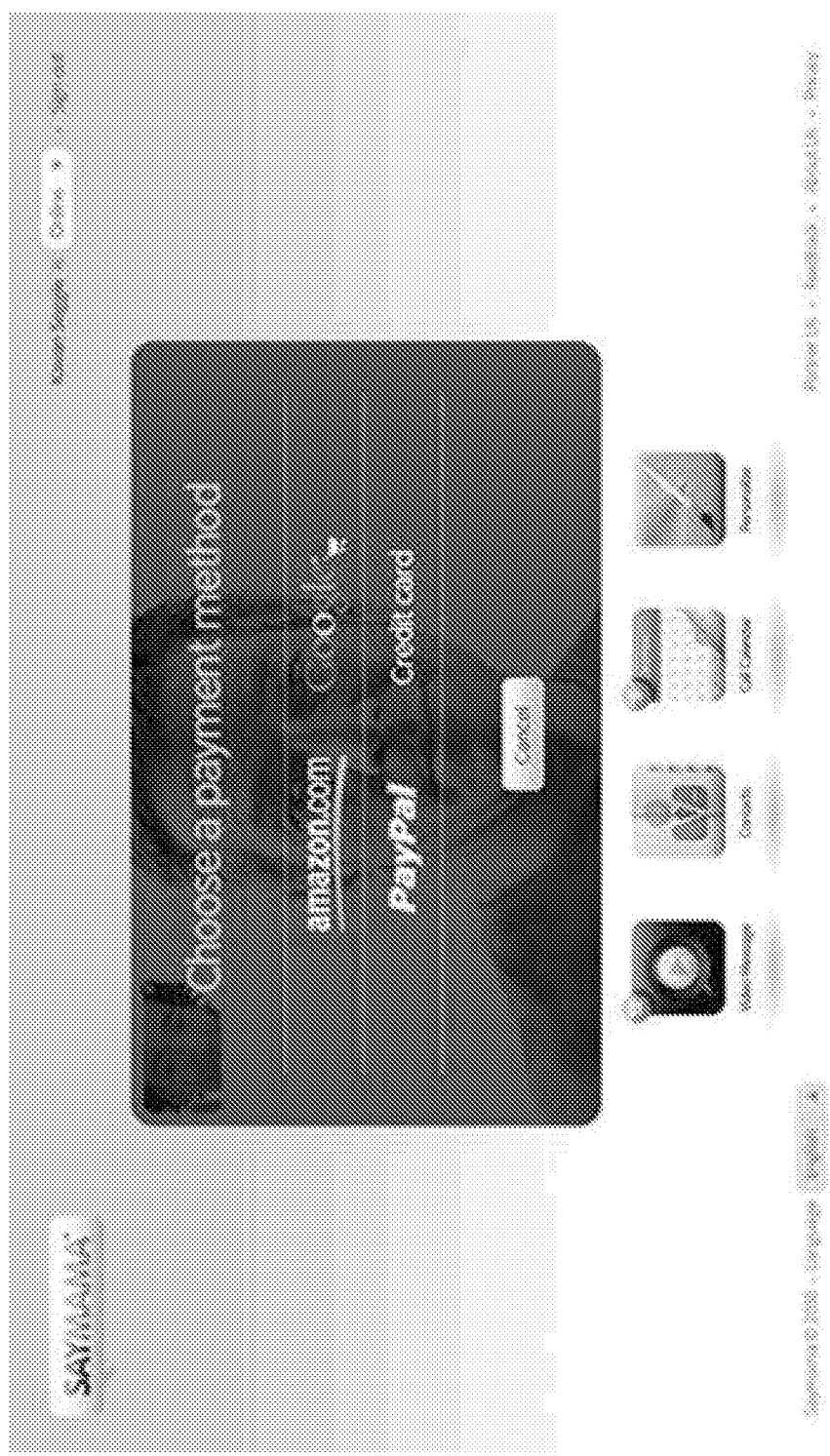
FIG. 6 illustrates an example GUI for displaying a list of available payment methods, consistent with various embodiments of the disclosed technology.

FIG. 5 illustrates an example GUI 500 for displaying a charge notification to a user in an RTC application, consistent with various embodiments of the disclosed technology. The example GUI 500 illustrates a charge notification displayed on the client device. The RTC application receives the charge notification sent from the service provider and displays it to the client. The client may choose to accept or decline the charge. In some embodiments, if the client declines the charge the call may be disconnected. On the other hand, if the client chooses to accept the charge, the client is charged and connected to the service provider.

Figure 7:
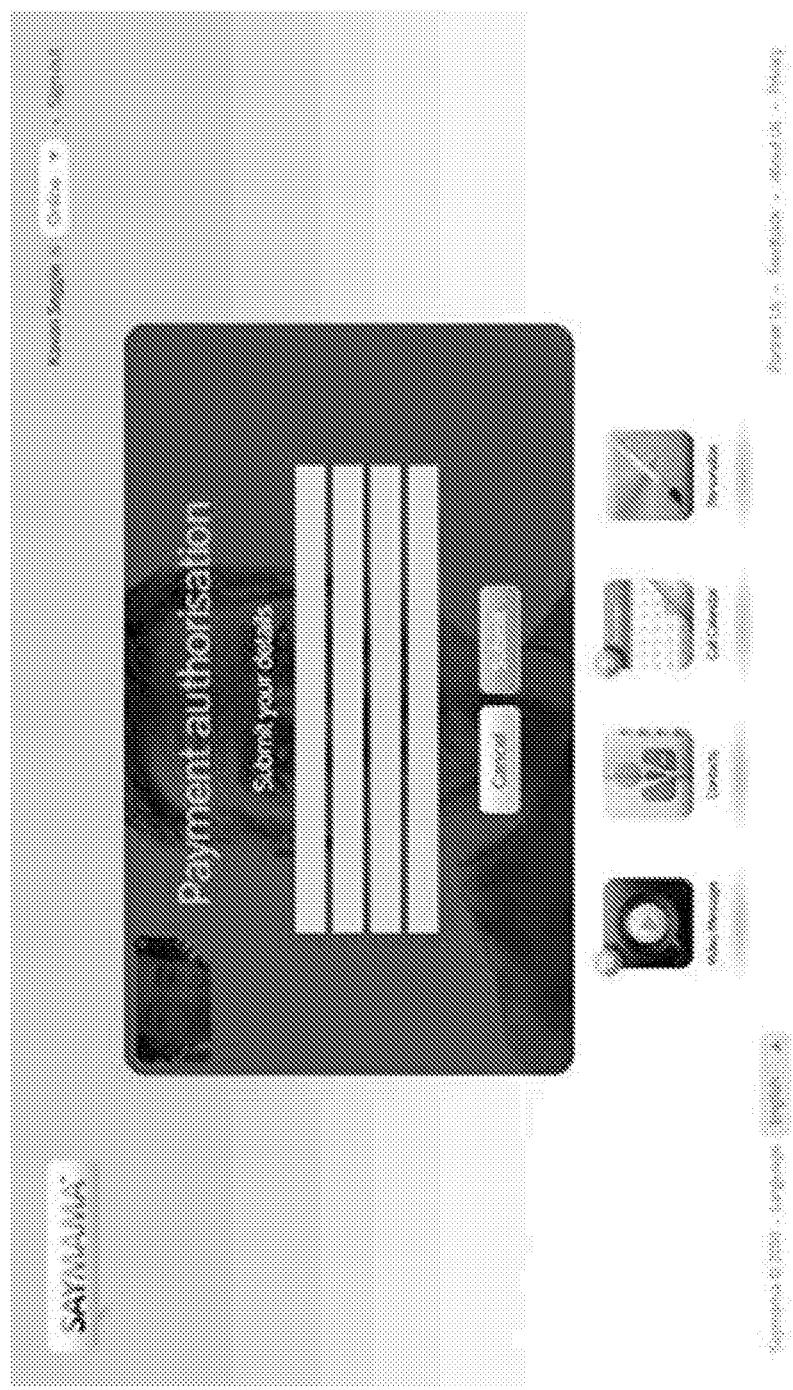
FIG. 7 illustrates an example GUI for providing payment details to the RTC application, consistent with various embodiments of the disclosed technology.

In some embodiments, upon accepting the charge, the client may be presented with a list of available payment methods that the client can choose from to pay the service provider. An example GUI showing the list of available payment methods is illustrated in GUI 600 of FIG. 6. Upon selecting one of the payment methods displayed in GUI 600, the RTC application requests the client to provide the payment details, e.g., credit card number, checking account number, etc. FIG. 7 illustrates an example GUI 700 for providing payment details to the RTC application, consistent with various embodiments of the disclosed technology. After the payment is successfully completed, the client is connected to the service provider.

Figure 8:
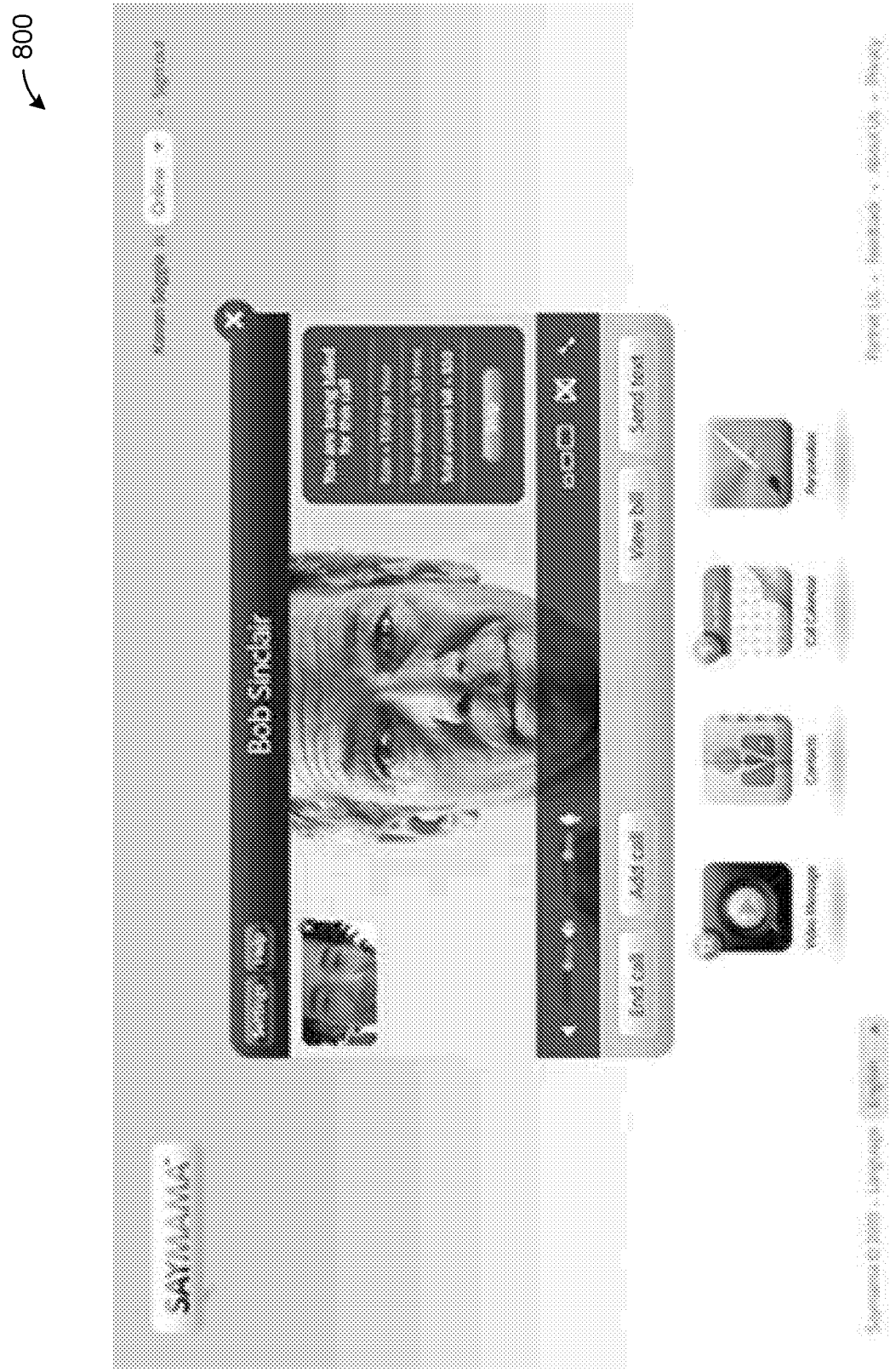
FIG. 8 illustrates an example GUI displaying a service provider and a client engaged in a conversation using the RTC application, consistent with various embodiments of the disclosed technology.

The client can be charged in various ways, e.g., a flat fee, per hour, etc. If the client is charged on a per hour basis, the client may billed at the end of the call in which case the RTC application does not charge the client upon receiving the payment details in GUI 700. The RTC application may just validate the payment method in GUI 700 and then connect the call. The service provider and the client may engage in conversation as illustrated in GUI 800 of FIG. 8. The GUI 800 can display a variety of information including, charge per hour, duration of the call, current charges for the call, whether the call is billed, etc. Upon completing the call, the client is billed using the payment details provide in GUI 700.

In some embodiments, the client may provide a default payment method in his/her user profile created with the RTC application. If the client has a default payment method and enabled a single click payment, the client may make the payment in a single click of a button. For example, consider that the client has configured a default payment method and enabled single click payment in his profile. When the client receives a charge from the service provider, as illustrated in GUI 500, on selecting accept, the client is directly connected to the call and the GUI 800 is presented to the client. The payment method GUI 600 and payment detail GUI 700 may not displayed to the client.

Accordingly, embodiments of the disclosed technology enables a user of the RTC application to bill in a single click and to pay in a single click. It should be noted that the GUIs illustrated in FIGS. 4-8 are examples only. The GUIs can be designed in various ways, for example, the "Bill Button" can be implemented as a link or any other GUI element. The GUI 400-800 can display additional or less information, e.g., information related to the RTC application, users, the call, charges, etc.

Figure 9:
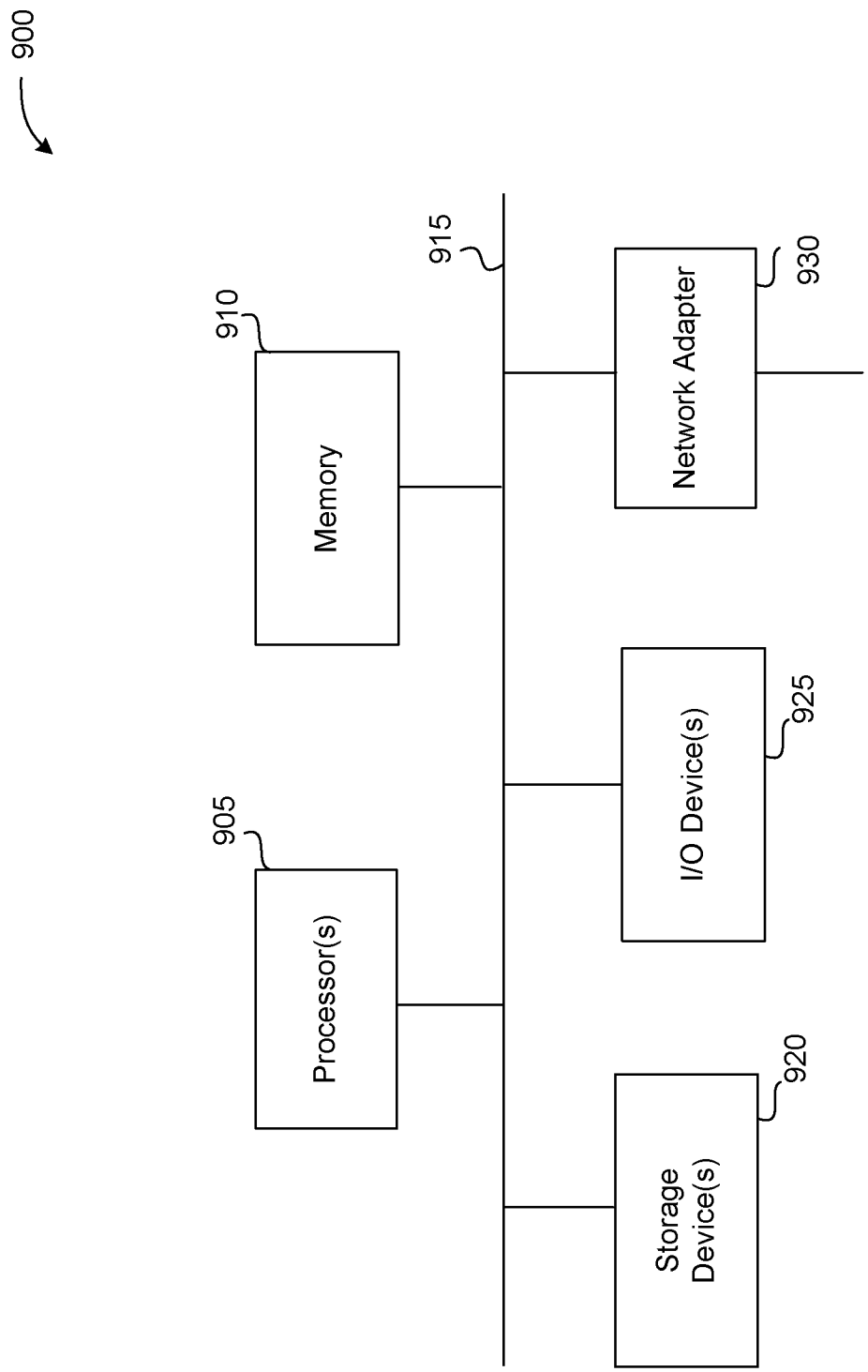
FIG. 9 is a block diagram of a computer system as may be used to implement features of some embodiments of the disclosed technology.

FIG. 9 is a block diagram of a computer system as may be used to implement features of some embodiments of the disclosed technology. The computing system 900 may be used to implement any of the entities, components or services depicted in the examples of FIGS. 1-8 (and any other components described in this specification). The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 910 can be implemented as software and/or firmware to program the processor(s) 905 to carry out actions described above. In some embodiments, such software or firmware may be initially provided to the processing system 900 by downloading it from a remote system through the computing system 900 (e.g., via network adapter 930).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, sub-steps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A system, comprising:
   one or more processors; and
   a memory storing instructions that, when executed by the one or more processors, cause the one or more processors to perform operations comprising:
   receiving a real time communication request from a client device;
   performing an evaluation of the number of client devices associated with the real time communication request, wherein the evaluation results in the coordination of peer-to-peer communications in the event of two client devices and an attempt to host a real time communication session using a first protocol in the event of three or more client devices; and
   invoking a second protocol for the real time communication session in the event that the attempt to host the real time communication session using the first protocol is unsuccessful.

2. The system of claim 1, the operations further comprising:
   attempting to transition the real time communication session from the second protocol to the first protocol in response to fast protocol connectivity success.

3. The system of claim 1, wherein the real time communication session supports audio and video on a single communication channel.

4. The system of claim 1; wherein coordination of peer-to-peer communications includes coordination of User Datagram Protocol peer-to-peer communications.

5. The system of claim 1, wherein the first protocol is the User Datagram Protocol.

6. The system of claim 1; wherein the second protocol is the Transmission Control Protocol.

7. The system of claim 1, the operations further comprising:
   coordinating the peer-to-peer communications after confirming that the first protocol communication is operative for the two client devices.

8. The system of claim 1, the operations further comprising:
   collecting network stream quality measurements from client devices.

9. The system of claim 8, wherein the network stream quality measurements include loss packet measurements and one-way packet queuing delay measurements.

10. The system of claim 1, the operations further comprising:
    sending real time transport control protocol receiver report messages to the client devices.

11. The system of claim 1, the operations further comprising designating client device feed qualities based upon at least one of:
    an evaluation of real time transport control protocol receiver report messages from the client devices,
    uplink adaptation monitoring to detect packet queuing delay, packet loss and jitter,
    modulating at least one of target titrate, size of video feed and number of frames per second,
    downlink adaptation monitoring of a high quality video feed and a low quality video feed, or
    peer-to-peer adaptation monitoring of a single communication session between the two client devices.

12. The system of claim 1, the operations further comprising:
    hosting a plurality of real time communication sessions.

13. The system of claim 12, the operations further comprising:
    dynamically distributing load across the plurality of real time communication sessions.

14. The system of claim 1, the operations further comprising:
    hosting an application program interface operative to supply analytics on real time communication sessions.

15. The system of claim 1, the operations further comprising:
    supplying to a client device a prompt regarding charges associated with a real time communication session.

16. The system of claim 15, the operations further comprising:
    supplying a client device with prompts for choosing a payment method for the charges.

17. A method comprising:
    receiving a real time communication request from a client device;
    performing an evaluation of the number of client devices associated with the real time communication request, wherein the evaluation results in the coordination of peer-to-peer communications in the event of two client devices and an attempt to host a real time communication session using a first protocol in the event of three or more client devices; and
    invoking a second protocol for the real time communication session in the event that the attempt to host the real time communication session using the first protocol is unsuccessful.

18. The method of claim 17, further comprising:
    attempting to transition the real time communication session from the second protocol to the first protocol in response to fast protocol connectivity success.

19. The method of claim 17, wherein the real time communication session supports audio and video on a single communication channel.

20. A non-transitory computer-readable medium comprising instructions, which when executed by a computing device, cause the computing device to perform operations comprising:
    receiving a real time communication request from a client device;
    performing an evaluation of the number of client devices associated with the real time communication request, wherein the evaluation results in the coordination of peer-to-peer communications in the event of two client devices and an attempt to host a real time communication session using a first protocol in the event of three or more client devices; and invoking a second protocol for the real time communication session in the event that the attempt to host the real time communication session using the first protocol is unsuccessful.

* * * * *